US012788122B2

(12) United States Patent
Matteis

(10) Patent No.: US 12,788,122 B2
(45) Date of Patent: Nov. 10, 2026

(54) THROW CADDY

(71) Applicant: Milan Dante Matteis, Great Falls, VA (US)

(72) Inventor: Milan Dante Matteis, Great Falls, VA (US)

( * ) Notice: Subject to any disclaimer, the term of this patent is extended or adjusted under 35 U.S.C. 154(b) by 276 days.

(21) Appl. No.: 18/781,264

(22) Filed: Jul. 23, 2024

(65) Prior Publication Data

US 2026/0026594 A1 Jan. 29, 2026

(51) Int. Cl.

| | |
|---|---|
| ***A45C 13/38*** | (2006.01) |
| ***A45C 13/10*** | (2006.01) |
| ***A45C 13/26*** | (2006.01) |
| ***A63B 65/10*** | (2006.01) |
| ***B62B 1/00*** | (2006.01) |
| ***B62B 1/12*** | (2006.01) |

(52) U.S. Cl.

CPC ............ *A45C 13/385* (2013.01); *A45C 13/10* (2013.01); *A45C 13/262* (2013.01); *B62B 1/008* (2013.01); *B62B 1/12* (2013.01); *A63B 65/10* (2013.01); *A63B 2244/15* (2013.01); *B62B 2202/40* (2013.01)

(58) Field of Classification Search

CPC ..... A45C 13/385; A45C 13/10; A45C 13/262; B62B 1/008; B62B 1/12; B62B 2202/40; B62B 2202/404; A63B 2244/15; A63B 65/10

See application file for complete search history.

(56) References Cited

U.S. PATENT DOCUMENTS 4,066,156 A 1/1978 Basile
5,074,571 A 12/1991 Reese
(Continued)

FOREIGN PATENT DOCUMENTS

CN 2455313 Y 10/2001
KR 200295489 Y1 11/2002
(Continued)

OTHER PUBLICATIONS

Strikeforce, "Drive Triple Roller", [online] https://www.krstrikeforce.com/products/Drive-Triple-Roller. Accessed Jul. 29, 2021 (9 pages).
(Continued)

*Primary Examiner* — James A Shriver, II
*Assistant Examiner* — Nicholas R. Kandas
(74) *Attorney, Agent, or Firm* — The Marbury Law Group, PLLC

(57) ABSTRACT

A throw caddy with a main body, wherein the main body has a first side surface, a second side surface, a front surface, a back surface, a top surface, and a bottom surface that oppose each other. A collapsible top portion is attached to the top surface of the main body. A removable tripod chair connected to the main body, Wheels rotatably coupled to one or more axles connected to the main body. A plurality of handles are attached to the main body and the removable tripod chair. Discus case pockets attached to the first and second side surfaces of the main body. A notebook pocket is attached to the second side surface of the main body. Adjustable legs located at the bottom surface of the main body. A large, zippered pocket attached to the front surface of the main body contains removable containers for organizing items.

16 Claims, 12 Drawing Sheets

(56) References Cited

U.S. PATENT DOCUMENTS

| | | | |
|---|---|---|---|
| 6,109,627 | A | 8/2000 | Be |
| 6,520,327 | B1 * | 2/2003 | Boardman |
| 6,722,671 | B2 | 4/2004 | Be |
| 7,584,972 | B2 * | 9/2009 | Myers |
| 10,850,167 | B2 | 12/2020 | Hurwitz et al. |
| 2002/0105156 | A1 * | 8/2002 | Glidden |
| 2003/0029751 | A1 * | 2/2003 | Boardman |
| 2006/0086631 | A1 | 4/2006 | Williams |
| 2007/0090615 | A1 | 4/2007 | Tan |
| 2008/0093238 | A1 | 4/2008 | Handelman et al. |
| 2013/0049312 | A1 | 2/2013 | Hou |
| 2013/0069324 | A1 | 3/2013 | Weibel et al. |
| 2020/0352301 | A1 * | 11/2020 | Blanchard |
| 2023/0030592 | A1 | 2/2023 | Hurwitz et al. |
| 2024/0238662 | A1 * | 7/2024 | Messenger |

FOREIGN PATENT DOCUMENTS

| | | | |
|---|---|---|---|
| KR | 20180001326 | A | 1/2018 |
| KR | 102138216 | B1 | 7/2020 |
| KR | 102175001 | B1 | 11/2020 |
| KR | 102175002 | B1 | 11/2020 |
| KR | 102291025 | B1 | 8/2021 |
| KR | 102340312 | B1 | 12/2021 |
| KR | 102460681 | B1 | 10/2022 |
| KR | 102548946 | B1 | 6/2023 |

OTHER PUBLICATIONS

BowlerX for the Love of Bowling, “KR Royal Flush 4×4 Ball Roller Royal/Black”, [online] https://www.bowlerx.com/kr-royal-flush-4x4-ball-roller-royal-black-krrf4x4/, Accessed Jun. 28, 2022 (11 pages).

* cited by examiner

THROW CADDY

BACKGROUND

This application discloses an equipment caddy for storing and carrying athletic throwing equipment for field events. Referred to herein as a "throw caddy," the apparatus is designed to organize and transport various throwing sports equipment such as discuses, shots, hammers, a training stick, and other related equipment items useful for participants in field events. Current solutions in the market for transporting sports equipment often lack the necessary features for organized storage and ease of carrying equipment over various terrains, as may be encountered in athletic facilities and during track and field events. Athletes and coaches need a robust, lightweight, and versatile caddy for carrying the heavy athletic equipment used in field events, such as shots, which weigh between 4 and 7.26 kilograms, depending on the athlete's age and gender. Traditional carts and bags do not offer specialized compartments for different types of equipment, leading to potential damage and difficulty in finding items quickly. Moreover, traditional carts and bags do not provide a seat for athletes to use while awaiting their throwing opportunity. Maintaining leg strength during hours-long meets is a key component of maximizing performance. The throw caddy is also sized to fit in most lockers.

SUMMARY

Various aspects include a throw caddy apparatus with a main body that features a first side surface, a second side surface connected to each other by a front surface and a back surface, a bottom surface, and a top surface. A collapsible top portion with a handle is connected to the top surface of the main body. A removable tripod chair with an upper pole and a handle is attached to the main body of the throw caddy. The handle of the chair is the handle of the throw caddy. The apparatus includes a plurality of off-roading wheels rotatably coupled to one or more axles connected to the main body. The apparatus further includes a plurality of pockets for holding discuses, referred to as "discus pockets," connected to the main body, removable discus holders, looped handles connected to the main body, practice-stick loops, and catch attached to the main body, a pocket for holding shoes, referred to as a "shoe pocket" attached to the main body, an insulated pocket connected to the main body, pockets for holding a notebook, a phone, and sunglasses connected to the main body, a plurality of adjustable legs located at the bottom surface of the main body, a first zippered pocket connected to the main body, and a plurality of removable containers included within the first zippered pocket, wherein each removable container includes a compartment configured to hold a shot or hammer.

In some aspects, the plurality of off-roading wheels includes a first off-roading wheel and a second off-roading wheel, each having a diameter between 6-12 inches.

In some aspects, the collapsible top portion includes a second zippered compartment having an interior volume and a zipper and towel loop/handle on an exterior surface, and the interior volume of the collapsible top portion contains vertical dividers.

In some aspects, the insulated water bottle pocket is rectangular, measuring 7-17 inches in height and 3-4 inches in width.

In some aspects, each discus pocket is rounded, measuring 9-15 inches in length and 4-6 inches in width.

In some aspects, the large zipper pocket is rectangular, measuring 19-29 inches in height and 5-15 inches in width.

In some aspects, the adjustable legs have a flange shape with a protruding stake-shaped end and a removable rubber cover that covers the protruding stake-shaped end.

In some aspects, each removable shot/hammer container has a foam-lined interior, with a handle and strap that are located on the exterior of the removable container.

In some aspects, each of the plurality of off-roading wheels is coupled to the one or more axles with a retainer clamp, each of the off-roading wheels includes a wheel hub and a quick-release button attached to the wheel hub, and the quick-release button is configured to couple a wheel to one of the one or more axles.

In some aspects, the large zipper pocket is located on the front surface, and three removable containers are located inside the large zipper pocket, and each has its own metal shelved compartment. In such aspects, the third removable container is located between the plurality of off-roading wheels in a first direction and the first and second removable containers are spaced away from the plurality of off-roading wheels in the first direction.

In some aspects, a towel loop/handle of the collapsible top portion of the main body is located on the first side surface, a discus pocket is located on the first side surface, a main body handle is located on the first side surface between the discus holder and the collapsible top portion, a first axle for rotatably supporting a first off-roading wheel is coupled to the first side surface of the main body, and the insulated water bottle pocket is located on the first side surface between the first off-roading wheel and the discus holder.

In some aspects, the first axle and the first off-roading wheel are sized so that the first off-roading wheel extends past the first side surface in a first direction and a second direction.

In some aspects, a handle is located on the main body on the second side surface, the notebook pocket is located on the second side surface, a discus pocket is located on the second side surface between the handle and notebook pocket, and a second axle for rotatably supporting a second off-roading wheel is coupled to the second side surface of the main body.

In some aspects, the notebook pocket is located between the second off-roading wheel and the second side surface in a first direction, second direction, and third direction.

In some aspects, each of the plurality of discus cases is sized to hold two discuses.

BRIEF DESCRIPTION OF THE DRAWINGS

The accompanying drawings, which are incorporated herein and constitute part of this specification, illustrate exemplary embodiments of the claims and together with the general description given above and the detailed description given below, serve to explain the features of the claims.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include an equipment caddy that is particularly designed and uniquely equipped to carry the equipment and paraphernalia needed by athletes competing in field events, such as shotput, discus, and/or hammer throw. Various embodiments include a throw caddy apparatus with a main body featuring a first side surface, a second side surface, a front surface, a back surface, a top surface, and a bottom surface that oppose each other. A collapsible top portion is attached to the top surface of the main body. A removable tripod chair is connected to the main body. Wheels are rotatably coupled to one or more axles connected to the main body. The throw caddy includes a plurality of handles attached to the main body and the removable tripod chair. Discus case pockets are attached to the first and second side surfaces of the main body. Pockets for storing items are attached to the first and second side and back surfaces of the main body. Adjustable legs are located at the bottom surface of the main body. A large, zippered pocket is attached to the front surface of the main body containing removable containers for organizing items.

The descriptions of various embodiments use spatially relative terms, such as “beneath,” “below,” “lower,” “above,” “upper,” and the like, which are for ease of description to identify an element’s or feature’s relationship to another element(s) or feature(s) of the equipment caddy as illustrated in the figures. The spatially relative terms are intended to encompass different orientations of the equipment caddy in use or operation in addition to the orientation depicted in the figures. The apparatus may be otherwise oriented (rotated 90 degrees or at other orientations), and the spatially relative descriptors used herein may likewise be interpreted accordingly. Further, any reference to elements in the singular, for example, using the articles “a,” “an,” or “the” is not to be construed as limiting the element to the singular, particularly in the claims.

Figure 1:
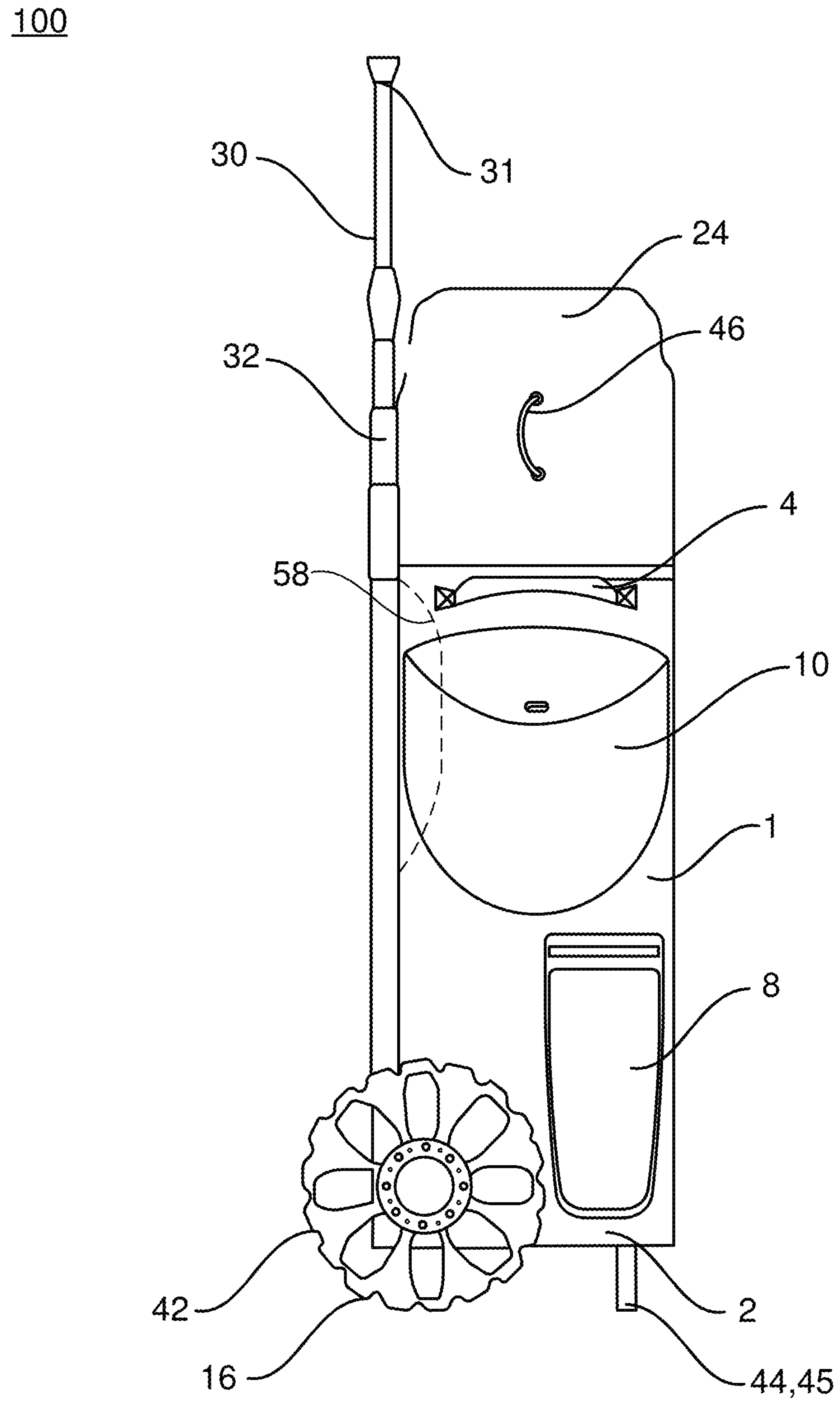
FIG. 1 is a first side view of the throw caddy.

FIG. 1 illustrates a side view of the throw caddy 100 apparatus showing the main body 1 of the throw caddy. The main body 1 may be rectangular in shape, measuring approximately 19-29 inches in height, 9-16 inches in width, and 5-15 inches in depth. The main body 1 may be constructed from high-strength fabric, such as high-strength nylon, canvas, or vinyl.

The main body 1 is connected to a removable tripod chair 30 that is not fully visible in FIG. 1 with a seat portion 58 covered by fabric of the main body. The removable tripod chair 30 has a handle 31 attached to an upper pole 32. The removable tripod chair 30 may be made of aluminum, providing a lightweight yet sturdy structure to support all components of the throw caddy 100. The removable tripod chair 30 may be connected to the main frame 2 via fasteners, straps, Velcro®, or methods known in the art. The handle 31 of the removable tripod chair 30 is the handle of the throw caddy 100 and is adjacent to a collapsible top portion 24. The collapsible top portion 24 includes a towel loop/handle 26.

Figure 11:
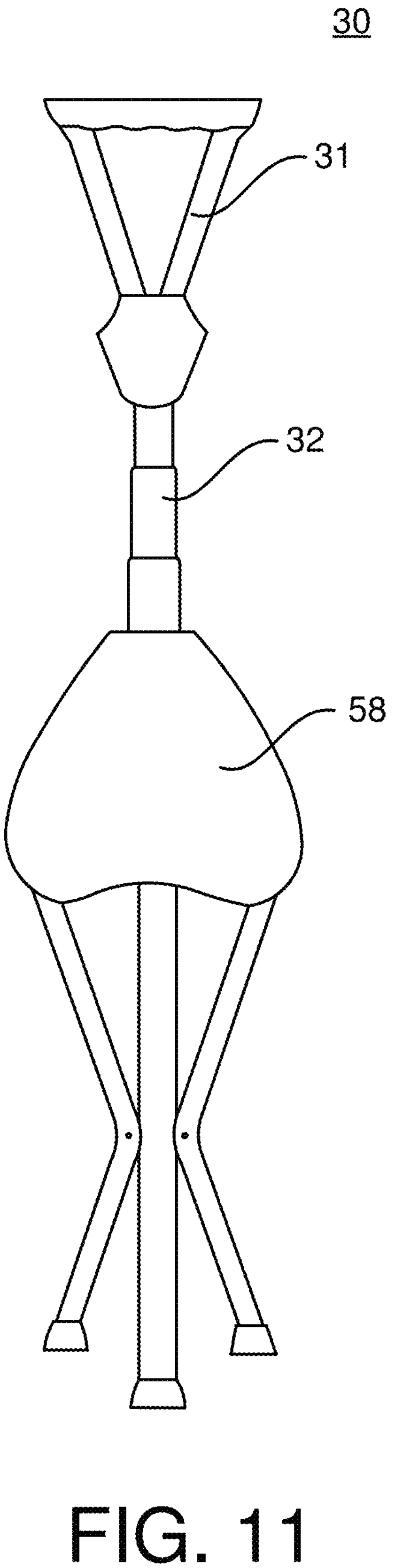
FIG. 11 is a front view of the removable tripod chair of the throw caddy of FIG. 1.

The chair 30 can be made of lightweight metal, such as aluminum, similar to the pole. A seat 58 is attached to the upper pole 32, and the seat 58 can be made of durable material, such as vinyl. The seat 58 is shown in FIG. 11.

A first off-roading wheel 16 is rotatably coupled to the main body 1. The first off-roading wheel 16 can be approximately 6-12 inches in diameter and constructed from ruggedized rubber with reinforced steel rims. The off-roading wheel 16 extends past the main body 1 in an x and a y direction as shown in FIG. 1.

Figure 3:
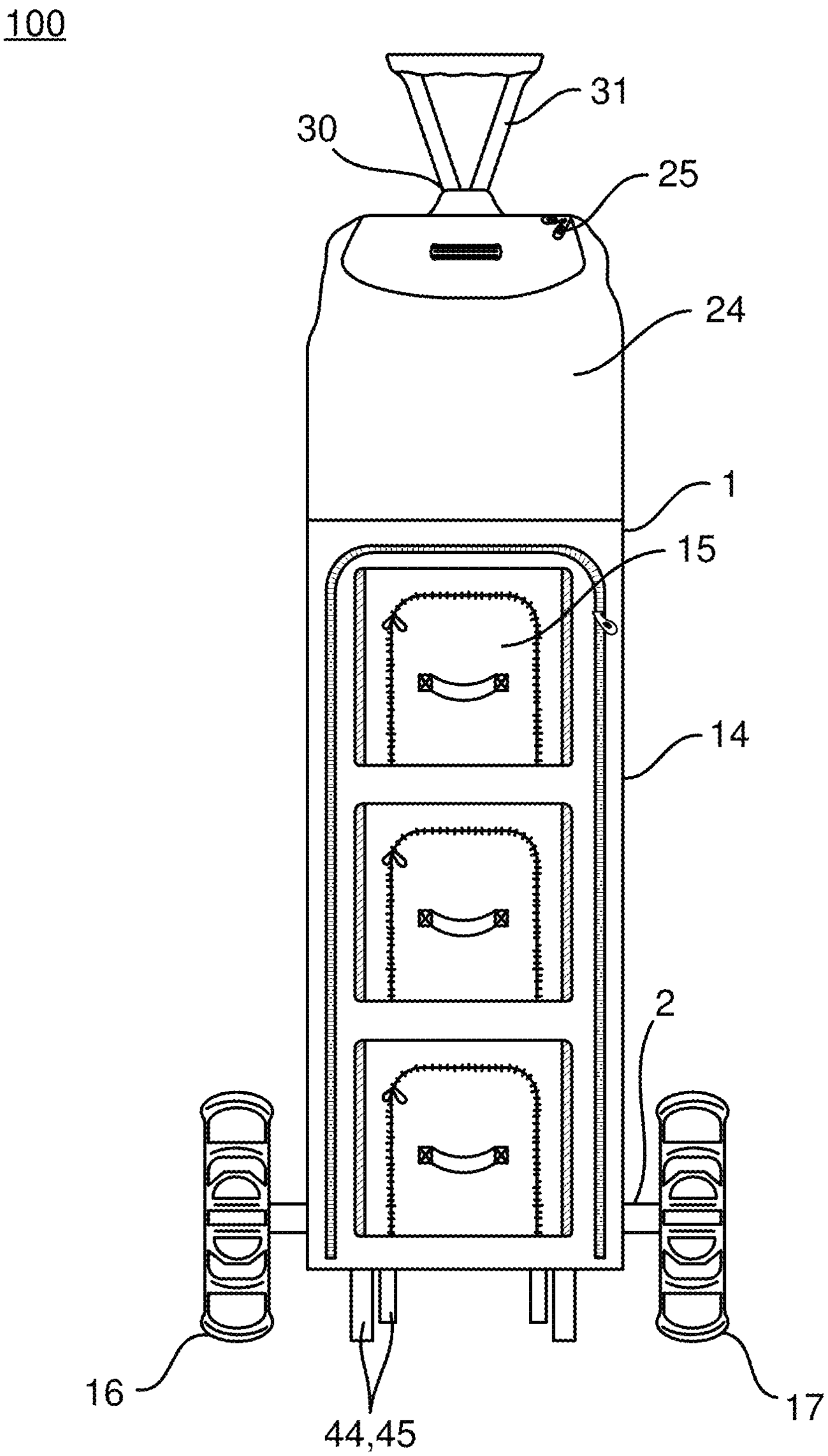
FIG. 3 is a front-side view of the throw caddy of FIG. 1.

The first off-roading wheel 16 is rotatably coupled to an axle 2 using any fastener known in the art, with the axle 2 attached to the main body 1. The axle 2 is depicted in FIG. 3.

In FIG. 1, a collapsible top portion 24 is attached to the main body 1. The collapsible top portion 24 is shown in an elongated state in FIG. 1, and shown in a collapsed state in FIG. 2 described below. This collapsible top portion 24 includes a towel loop/handle 26 for easy access and additional storage. The collapsible top portion 24 may be adjustable in height and made of water-resistant nylon with aluminum framing.

The collapsible top portion 24 is adjacent to the handle 31 of the removable tripod chair 30. The main body 1 also includes looped handles 4 that can be made from sturdy nylon with reinforced stitching and Velcro fasteners, providing an ergonomic grip for carrying the throw caddy 100.

There is a discus case pocket 10 underneath the looped handle 4. This discus case pocket 10 may be rounded, measuring approximately 9-15 inches in length and 4-6 inches in width, and can be made with sturdy nylon, securely holding two discuses within handled cases.

Below the discus case pocket 10, there is an insulated pocket 8 for a water bottle. The insulated pocket 8 may be rectangular and approximately 7-17 inches in height and 3-4 inches in diameter, with a foam lining for thermal insulation and a durable nylon exterior, ensuring that the water bottle remains at the desired temperature.

Adjacent to the first off-roading wheel 16, the bottom surface of the main body 1 features a plurality of adjustable legs 44. These legs 44 are metal and encased in a rubber cover 45 to provide stability and prevent slipping on various surfaces. The legs 44 provide firm support in grassy areas. The legs 44 are foldable, allowing for compact storage when not in use.

Figure 2:
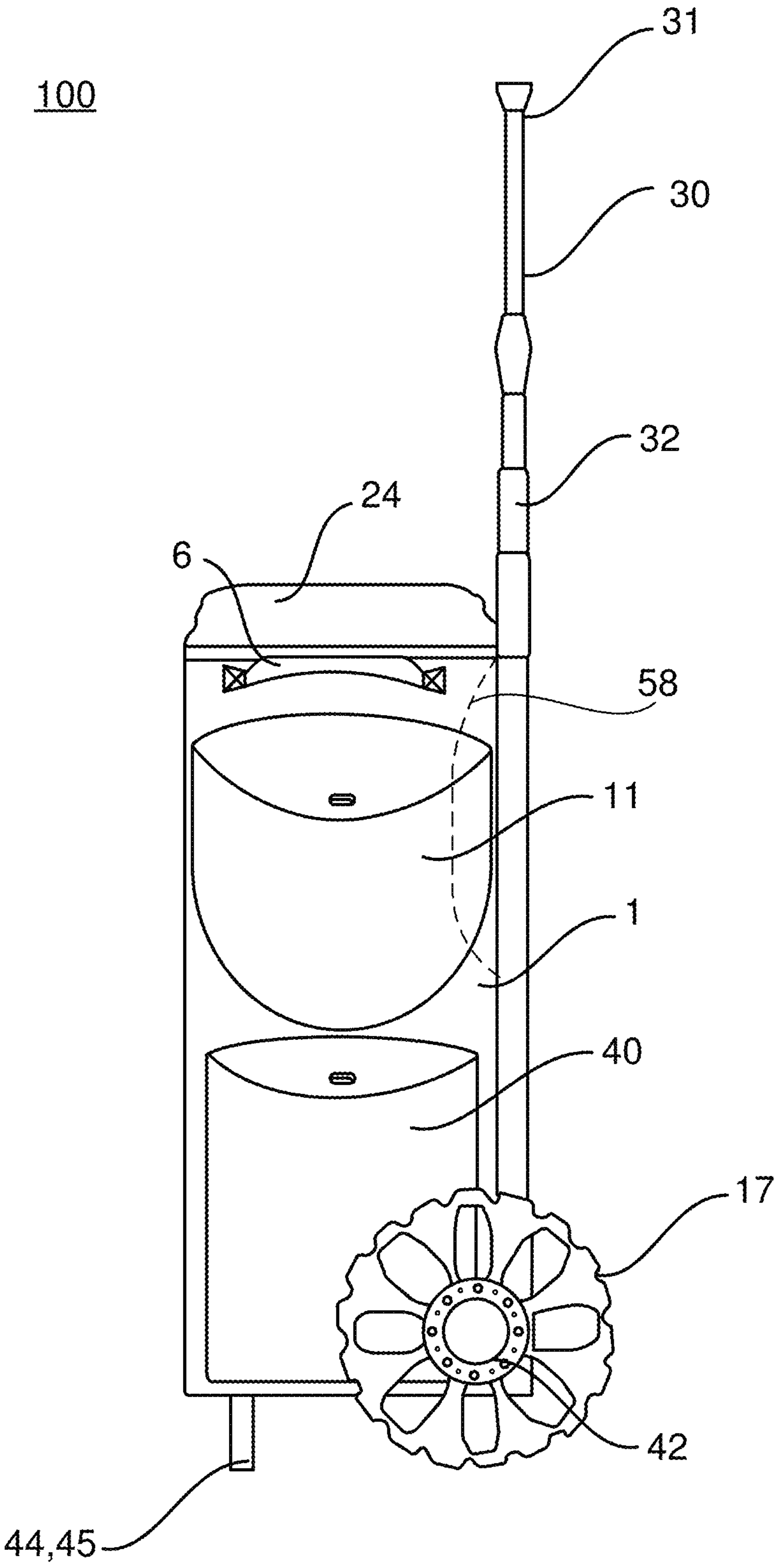
FIG. 2 is a second side view of the throw caddy of FIG. 1.

FIG. 2 illustrates a second-side view of the throw caddy 100 apparatus. The side view has the main body 1 connected to a removable tripod chair 30 and a second off-roading wheel 17 rotatably connected to the main body 1. A second looped handle 6 is connected to the main body 1. A second discus case pocket 11 is connected to the main body 1 and located underneath a second looped handle 6. The removable tripod chair 30 is connected to the main frame 2. The removable tripod chair 30 may feature a telescopic upper pole 32 that clips into the main body 1 and slides in behind a backside fabric. The handle 31 of the chair 30 is the handle of the throw caddy 100.

The second off-roading wheel 17 can be approximately 9 inches in diameter and constructed from ruggedized rubber with reinforced steel rims. The second off-roading wheel 17 can be designed to provide stability and ease of movement over rough terrain. The second off-roading wheel 17 is rotatably coupled to an axle 3 that is attached to the sides of the main body 1 via fasteners used in the art to ensure durability and reliability during transport. The axle 3 is depicted in FIG. 3. In an exemplary embodiment, a first axle 2 and a second axle 3 oppose each other. The off-roading wheel 17 extends past the main body 1 in an x and a y direction as shown in FIG. 2.

In FIG. 2, the collapsible top portion 24 is shown in a collapsed/compressed state. The second looped handle 6 is located below the collapsible top portion 24 and the second looped handle 6 is connected to the main body 1. The second looped handle 6 may be designed with ergonomic contours for a comfortable grip and can be made from durable nylon with reinforced stitching and Velcro® fasteners. The second looped handle 6 can facilitate lifting and carrying the throw caddy 100, offering stability on rough terrain.

Underneath the second looped handle 6, there is a second discus case pocket 11. The second discus case pocket 11 may be rounded, measuring approximately 12 inches in length and 4-6 inches in width, and can be made with sturdy nylon, securely holding two discuses within the pocket 11.

Below the second discus case pocket 11, there is a notebook pocket 12. The notebook pocket 12 may be rectangular, designed to fit A5 or letter-size notebooks, and can be made from durable nylon with adjustable Velcro straps and plastic dividers. The notebook pocket 12 may provide organized storage for notebooks, pens, and other writing utensils. The notebook pocket 12 extends past the main body 1 in an x direction and a y direction as shown in FIG. 2.

FIG. 3 illustrates a front view of the throw caddy 100. The front view shows the main body 1. The main body 1 includes a large, zippered pocket 14. The large, zippered pocket 14 can be rectangular and may be approximately 19-29 inches in height, 5-15 inches in width and made from durable nylon with aluminum shelves inside. This large, zippered pocket 14 is designed to contain three separate removable containers 15 for shots and hammers, providing organized storage. Each removable container 15 may be cubic in shape.

In an exemplary embodiment, the throw caddy 100 has four adjustable legs 44. These legs 44 may be located at the four corners of the bottom surface of the main body 1, providing stability and balance. Each leg 44 can be made from metal. The legs 44 are foldable, allowing for compact storage when not in use, and may be adjustable in height to accommodate different terrain conditions. In some embodiments, the legs 44 may be capped with rubber.

FIG. 3 also shows the collapsible top portion 24 (in the elongated state) with a zipper 25 attached to the top surface of the collapsible top portion 24 of the main body 1. The collapsible top portion 24 may be adjustable in height and made of water-resistant nylon with aluminum framing, offering additional storage space and easy access. The zipper 25 provides a convenient means for opening and closing the collapsible top portion 24.

Figure 4:
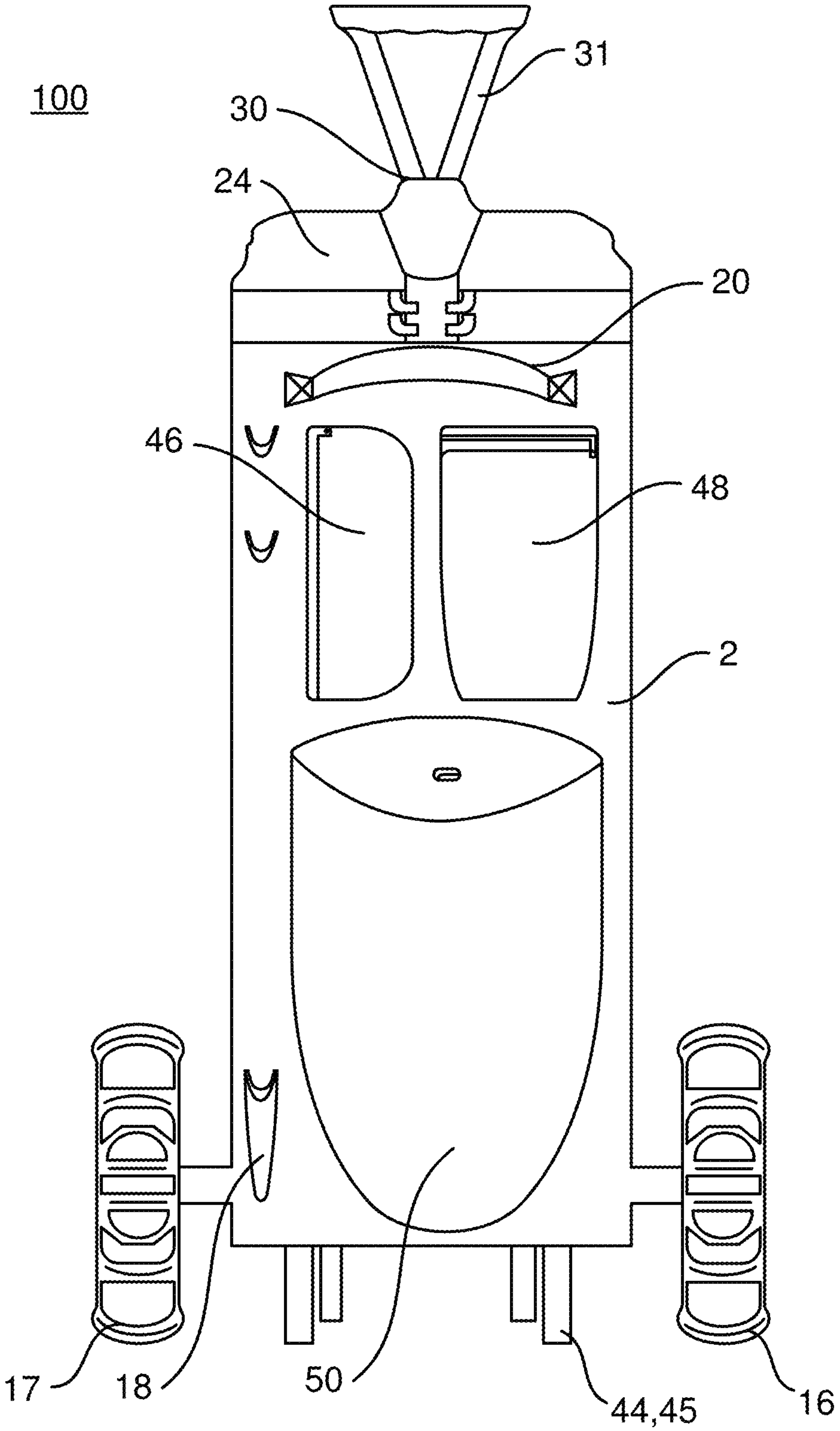
FIG. 4 is a back-side view of the throw caddy of FIG. 1.

FIG. 4 illustrates a back view of the throw caddy 100. The back view shows the main body 1 with a catch 18 and a plurality of loops 19 for holding a practice stick (i.e., practice stick loops 19 and catch 18). The catch 18 and loops 19 can be made from a durable fabric such as nylon with Velcro® fasteners. Each stake 18 may be encased in a rubber cover to enhance grip and prevent slipping or scratching. The stakes 18 are retractable, allowing for compact storage when not in use. A handle 20 for the main body 1 is located underneath the collapsible top portion 24 and the tripod handle 31. The handle 20 may be used to lift the throw caddy 100.

Three additional pockets 46, 48, and 50 are located on the main body 1 of the throw caddy 100. The first pocket 46 may be designed to store smaller accessories such as a phone, keys, or a wallet. The first pocket 46 can be made from durable fabric and may include a zipper or Velcro® closure for secure storage. The second pocket 48 is designed for storing sunglasses. The second pocket 48 can be smaller in size, and made from fabric with a liner with a secure zipper closure to keep the sunglasses safe and accessible. The third pocket 50 can hold a shoe drawstring bag containing throwing shoes. The third pocket 50 may be rectangular and made from reinforced nylon with an adjustable strap or Velcro closure.

Figure 12:
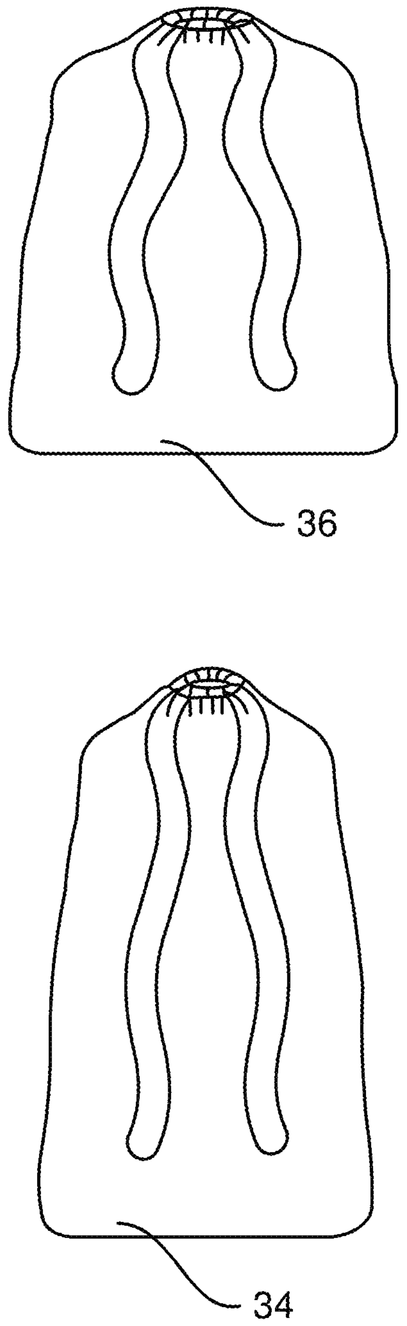
FIG. 12 is a front view of a wheel drawstring bag and a shoe drawstring bag of the throw caddy of FIG. 1.

The third pocket 50 may hold a washable, oversized shoe drawstring bag 34. A washable wheel drawstring bag 36 containing the wheels 16, 17 may be slung over the handle of the throw caddy 100 when they are not in use, such as when the throw caddy 100 is in a locker or vehicle. The shoe drawstring bag 34 and the wheel drawstring bag 36 are depicted in FIG. 12.

Figure 5:
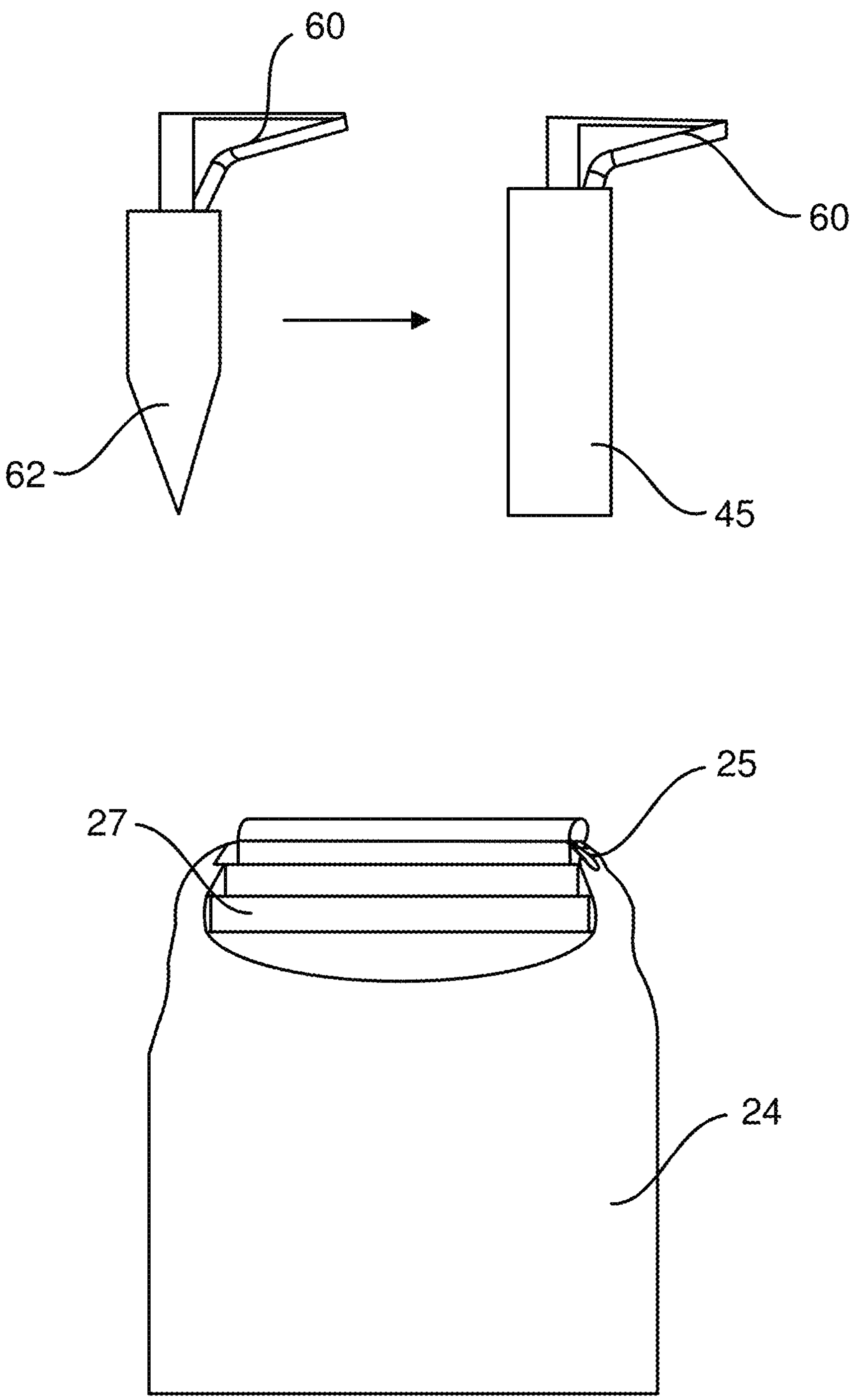
FIG. 5 is a side view of an adjustable leg and collapsible top portion of the throw caddy of FIG. 1.

FIG. 5 illustrates the adjustable legs 44 may have a flange shape 60 with a protruding stake-shaped end 62. The protruding stake-shaped end 62 can be encased by a rubber cover 45, providing stability and preventing slipping or scratching on various surfaces. The legs 44 are designed to fold in on a hinge for compact storage when not in use. When the collapsible top portion 24 is opened via the zipper 25, it may have fabric vertical dividers 27. These dividers 27 can be made from durable fabric and are intended to organize and separate stored items within the throw caddy 100. The vertical dividers 27 enhance the functionality of the storage space, allowing for easy access and organization of the contents.

Figure 6:
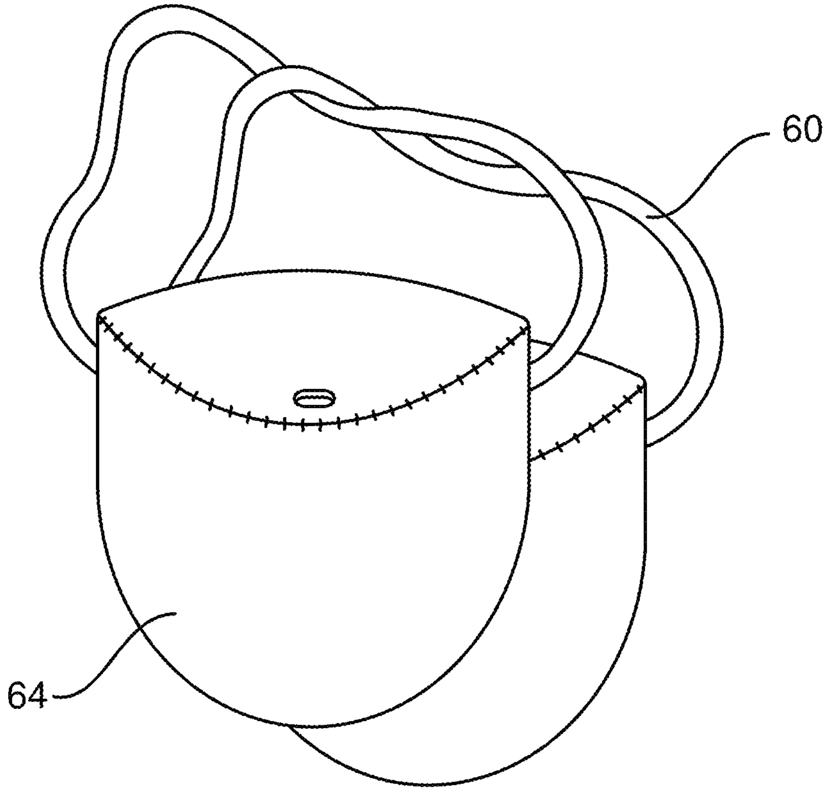
FIG. 6 is a front view of a removable discus case of the throw caddy of FIG. 1.

FIG. 6 illustrates the discus case 64, which is designed to securely hold two discuses, providing protection and easy transport. The discus case 64 can be rounded in shape, with dimensions that will accommodate the standard size of a discus. The discus case 64 can be made with durable nylon to withstand wear and tear. The discus case 64 can be sectioned inside to separate the two discuses. The strap 66 is attached to the discus case 64 for easy carrying. The strap 66 is made from sturdy nylon with reinforced stitching to ensure durability and prevent tearing. The length of the strap 66 is adjustable, allowing for comfortable carrying over the shoulder or by hand.

Once the discuses are placed inside the discus case 64, the discus case 64 can be placed into the discus case pockets 11, 12 on the throw caddy 100. The discus case pockets 10, 11 are depicted in FIGS. 1 and 2.

Figure 7:
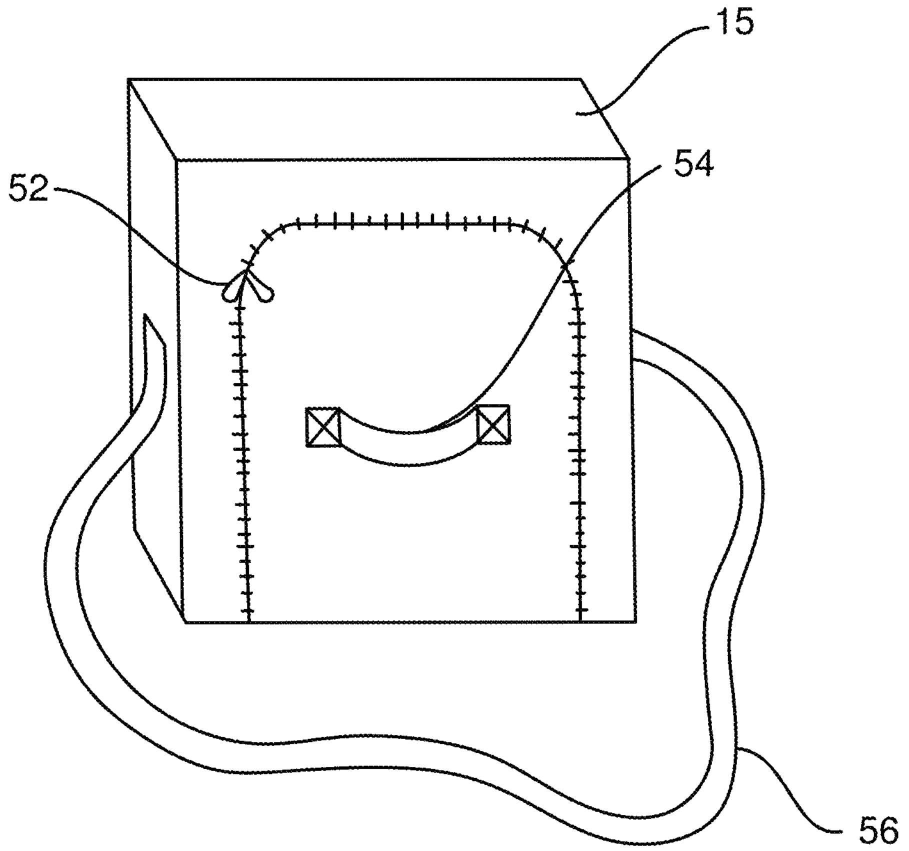
FIG. 7 is a top view of a removable shot/hammer container, in a closed state, of the throw caddy of FIG. 1.

FIG. 7 illustrates a removable shot/hammer container 15 that includes a zipper 52, a handle 54, and a strap 56. FIG. 7 shows the closed state of the removable shot/hammer container 15.

Figure 8:
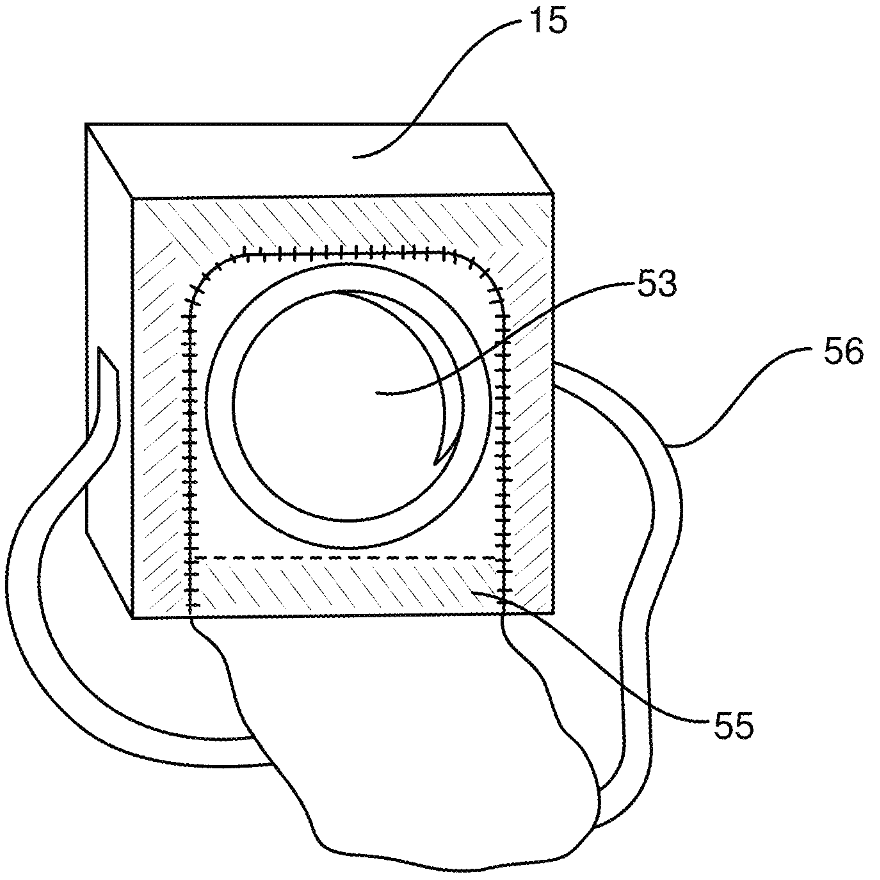
FIG. 8 is a cross-sectional view of the removable shot/hammer container, in an opened state, of the throw caddy of FIG. 1.

FIG. 8 illustrates a cross-sectional view of a shot/hammer container 15, in which each container 15 encloses a compartment that has a foam lining 55. In some embodiments, the foam lining 55 may cover the entirety of the compartment located inside of the container 15. FIG. 8 shows an opened state of the removable container 15 in which a shotput shot or hammer 53 is stored inside of the container 15.

Figure 9:
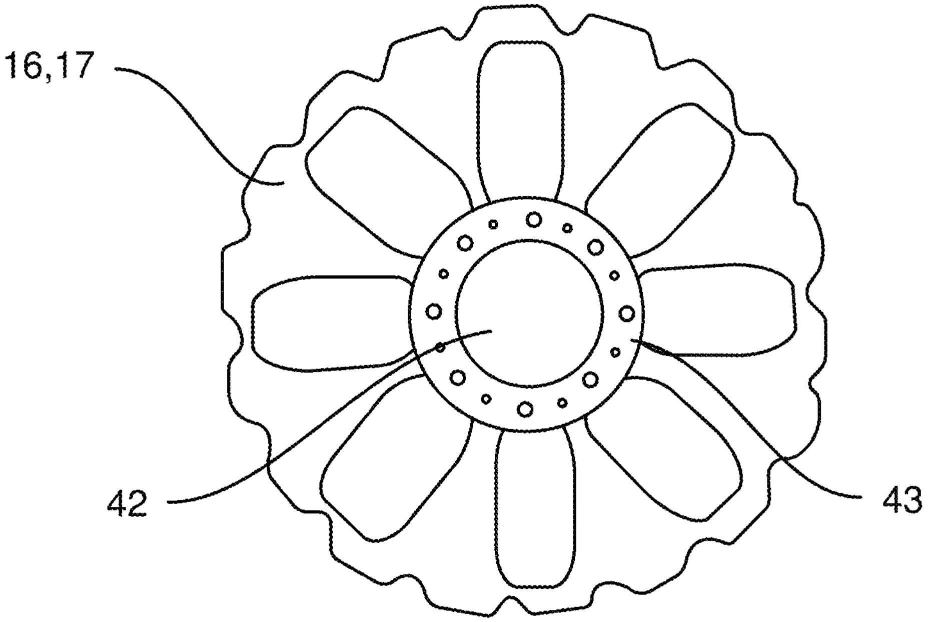
FIG. 9 is a side view of an off-roading wheel of the throw caddy of FIG. 1.

FIG. 9 illustrates that each of the off-roading wheels 16, 17 may have a quick-release button 42 (i.e., wheel release button) located at a center of a wheel hub 43.

As illustrated in FIGS. 3, 4, and 9—the wheel hub 43 is a central part of each wheel 16, 17 and houses bearings and connects to the axles 2, 3. The axles 2, 3 are depicted in FIGS. 3 and 4. This quick-release button 42 is located at the center of the wheel hub 43, designed to engage with the axle 2 to lock the wheel 16, 17 in place and allow for the easy removal of the off-roading wheels 16, 17 from the axles 2, 3 of the throw caddy 100. The quick-release button 42 is connected to a locking mechanism inside the wheel hub 43. When the quick-release button 42 is pressed, it disengages the lock, allowing the wheel 16, 17 to be removed from the axle 2. The wheels 16, 17, designed for rough terrain, can be approximately 9 inches in diameter and constructed from ruggedized rubber with reinforced steel rims, ensuring durability and ease of movement.

Figure 10:
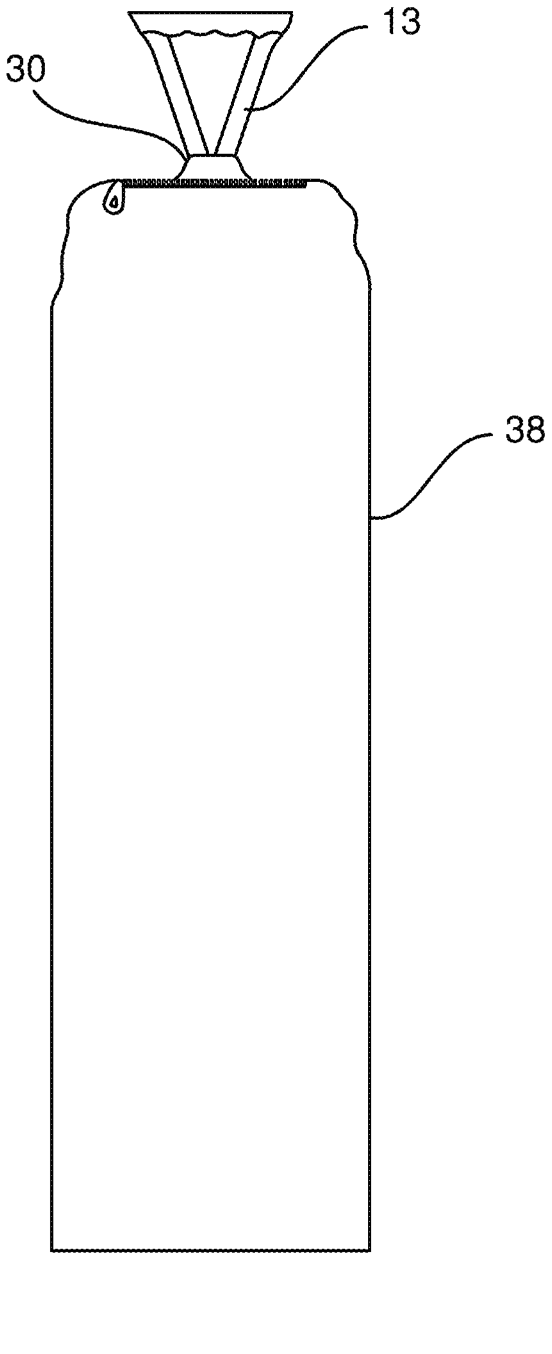
FIG. 10 is a side view of a rain cover on the throw caddy of FIG. 1.

FIG. 10 illustrates a rain cover 38 that may be included to cover the main body 1 of the throw caddy 100, protecting it and its contents from rain. The rain cover 38 can be made from waterproof fabric and designed/dimensioned to fit snugly over the throw caddy. The tripod handle 31 of the removable tripod chair 30 may protrude from the rain cover 38, allowing the user to carry or move the throw caddy 100 when it is covered.

FIG. 11 illustrates a removable tripod chair 30 that may have a seat 58 connected to the handle 31 via the upper pole 32. The seat 58 can provide a user a convenient seating option when detached from the main body 1. The removable tripod chair 30 can be made from lightweight metal for the pole and durable vinyl for the seat 58.

FIG. 12 illustrates the shoe drawstring bag 34, which may be an oversized bag to accommodate shoes of various sizes. This bag can be made from washable fabric with a drawstring closure, and designed to store shoes securely. While FIG. 12 shows the wheel drawstring bag 36 with a drawstring closure, other closure mechanisms may be used, such as snaps, Velcro®, zippers, etc.

The wheel drawstring bag 36 can be used to store the removable off-roading wheels 16, 17, of FIGS. 1-4 and 9, when the wheels 16, 17 are not in use.

The preceding description of the disclosed embodiments is provided to enable any person skilled in the art to make or use the present invention.

Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

Various embodiments may include all, or some but not all, of the structures and features described herein. Examples of various different combinations of structures and features are provided below.

Example 1. A throw caddy apparatus (100) with a main body (1), wherein the main body (1) has a first side surface, a second side surface connected, a front surface, a back surface, a bottom surface, and a top surface. A collapsible top portion (24) is connected to the top surface of the main body (1), the collapsible top portion (24) including a handle (31) and a towel loop/handle (46). A removable tripod chair (30) with an upper pole (32) and a handle (31) is attached to the upper pole (32). The apparatus includes a plurality of off-roading wheels (16, 17) rotatably coupled to one or more axles (2, 3) that are connected to the main body (1), a plurality of discus case pockets (10, 11) connected to the main body (1), a plurality of discus cases (64, 66), a plurality of looped handles (4) connected to the main body (1), an insulated pocket (8) connected to the main body (1), a notebook pocket (12) connected to the main body (1), a catch (18) and loops (19), a pocket for sunglasses (46) connected to the main body (1), a pocket for a phone and other personal items (48) connected to the main body (1), a plurality of loops and catch for a training stick (18) connected to the main body (1), a plurality of adjustable legs (44) located at the bottom surface of the main body (1), a first zippered pocket (14) connected to the main body (1), and a plurality of removable containers (15) included within the first zippered pocket (14), wherein each removable container (15) includes a compartment configured to hold a shot or hammer.

Example 2. The throw caddy apparatus of example 1, in which the plurality of off-roading wheels (16, 17) include a first off-roading wheel (16) and a second off-roading wheel (17) each having a diameter between 6-12 inches.

Example 3. The throw caddy apparatus of any of examples 1-3, in which the collapsible top portion (24) includes an interior volume that contains vertical dividers (27).

Example 4. The throw caddy apparatus of any of examples 1-3, in which the insulated pocket (8) is rectangular, measuring 7-17 inches in height and 3-4 inches in width.

Example 5. The throw caddy apparatus of any of examples 1-4, in which each discus case pocket (10, 11) is rounded, measuring 9-15 inches in length and 4-6 inches in width.

Example 6. The throw caddy apparatus of any of examples 1-5, in which the large zipper pocket (14) is rectangular, measuring 19-29 inches in height and 5-15 inches in width.

Example 7. The throw caddy apparatus of any of examples 1-6, in which the adjustable legs (44) have a flange shape with a protruding stake-shaped end (62), a removable rubber cover (45) covers the protruding stake-shaped end (62), and the flange shape protrudes from the rubber cover (45).

Example 8. The throw caddy apparatus of any of examples 1-7, in which each removable container (15) has a foam-lined interior (55), and a strap (56) and handle (54) located on the exterior of the removable container (15).

Example 9. The throw caddy apparatus of any of examples 1-8, in which each of the plurality of off-roading wheels (16, 17) is coupled to the one or more axels (2, 3) with a retainer clamp (not shown), each of the off-roading wheels (16, 17) includes a wheel hub (43) and a quick-release button (42) attached to the wheel hub (43), and the quick-release button (42) is configured to releasably couple a wheel (16, 17) to one of the one or more axles (2, 3).

Example 10. The throw caddy apparatus of any of examples 1-9, in which the large zippered pocket (14) is located on the front surface of the main body (1), and three removable containers (15) are located on the large zippered pocket (14) and separated by metal shelving, wherein the third removable container (15) is located between the plurality of off-roading wheels (16, 17) in a first direction and the first and second removable containers (15) are spaced away from the plurality of off-roading wheels (16, 17) in the first direction. In some aspects, the towel loop/handle (46) of the collapsible top portion (24) of the main body (1) is located on the first side surface, a discus case pocket (10) is located on the first side surface, a main body handle (4) is located on the first side surface between the discus pocket (10) and the collapsible top portion (24), a first axle (2) for rotatably supporting a first off-roading wheel (16) is coupled to the first side surface of the main body (1), and the insulated pocket (8) is located on the first side surface between the first off-roading wheel (16) and the discus case pocket (10).

Example 11. The throw caddy apparatus of any of examples 1-10, in which the first axle (2) and the first off-roading wheel (16) are sized so that the first off-roading wheel (16) extends past the first side surface in a first direction and a second direction.

Example 12. The throw caddy apparatus of any of examples 1-11, in which a handle (46) is located on the main body (1) on the second side surface, the notebook pocket (12) is located on the second side surface, a discus case pocket (11) is located on the second side surface between the handle (46) and the notebook pocket (12), and a second axle (3) for rotatably supporting a second off-roading wheel (17) is coupled to the second side surface of the main body (1).

Example 13. The throw caddy apparatus of any of examples 1-12, in which the notebook pocket (12) is located between the second off-roading wheel (17) and the second side surface in a first direction, second direction, and third direction.

Example 14. The throw caddy apparatus of any of examples 1-12, in which each of the discus case pockets (64) can hold 2 discuses.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A throw caddy apparatus, comprising:

a main body, wherein the main body has a first side surface, a second side surface connected, a front surface, a back surface, a bottom surface, and a top surface;

a collapsible top portion connected to the top surface of the main body, the collapsible top portion including a handle;

a removable tripod chair with an upper pole and a handle attached to the upper pole;

a plurality of off-roading wheels rotatably coupled to one or more axles that are connected to the main body;

a plurality of discus case pockets connected to the main body;

a plurality of looped handles connected to the main body;

an insulated pocket connected to the main body;

a notebook pocket connected to the main body;

a catch and loops connected to the main body;

a cell phone pocket connected to the main body;

a sunglasses pocket connected to the main body;

a shoe pocket connected to the main body;

a plurality of adjustable legs located at the bottom surface of the main body; and a first zippered pocket connected to the main body; and a plurality of removable containers included within the first zippered pocket, wherein each removeable container includes a compartment configured to hold a shot or hammer.

2. The throw caddy apparatus of claim 1, wherein the plurality of off-roading wheels comprise a first off-roading wheel and a second off-roading wheel each having a diameter between 6-12 inches.

3. The throw caddy apparatus of claim 1, wherein:

the collapsible top portion includes an interior volume that contains vertical dividers.

4. The throw caddy apparatus of claim 1, wherein the insulated water bottle pocket is rectangular, measuring 7-17 inches in height and 3-4 inches in width.

5. The throw caddy apparatus of claim 1, wherein each discus case is rounded and configured to hold two discuses, and the discus case is 9-15 inches in length and 4-6 inches in width.

6. The throw caddy apparatus of claim 1, wherein the large zipper pocket is rectangular, measuring 19-29 inches in height and 5-15 inches in width.

7. The throw caddy apparatus of claim 1, wherein:

the adjustable legs have a flange shape with a protruding stake-shaped end;

a removable rubber cover covers the protruding stake-shaped end; and the flange shape protrudes from the rubber cover.

8. The throw caddy apparatus of claim 1, wherein each removable container:

has a foam-lined interior; and a strap and a handle located on an exterior of the removable container.

9. The throw caddy apparatus of claim 1, wherein each of the plurality of off-roading wheels is coupled to the one or more axles, each of the off-roading wheels including a wheel hub and a quick-release button attached to the wheel hub, wherein the quick-release button is configured to releasably couple a wheel to one of the one or more axles.

10. The throw caddy apparatus of claim 1, wherein:

the large zipper pocket is located on the front surface of the main body;

three removable containers are located on the large zipper pocket; and the third removable container is located between the plurality of off-roading wheels in a first direction and the first and the second removable containers are spaced away from the plurality of off-roading wheels in the first direction.

11. The throw caddy apparatus of claim 1, wherein:

the towel loop/handle of the collapsible top portion of the main body is located on the first side surface;

a discus case pocket is located on the first side surface;

a main body handle is located on the first side surface between the discus case pocket and the collapsible top portion;

a first axle for rotatably supporting a first off-roading wheel is coupled to the first side surface of the main body; and the insulated water bottle pocket is located on the first side surface between the first off-roading wheel and the discus case pocket.

12. The throw caddy apparatus of claim 11, wherein the first axle and the first off-roading wheel are sized so that the first off-roading wheel extends past the first side surface in a first direction and a second direction.

13. The throw caddy apparatus of claim 1, wherein:

a handle is located on the main body on the second side surface;

the notebook pocket is located on the second side surface;

a discus case pocket is located on the second side surface between the handle and notebook pocket; and a second axle for rotatably supporting a second off-roading wheel is coupled to the second side surface of the main body.

14. The throw caddy apparatus of claim 6, wherein the notebook pocket is located between the second off-roading wheel and the second side surface in a first direction, second direction, and third direction.

15. The throw caddy apparatus of claim 1, wherein each of the plurality of discus cases is sized to hold two discuses.

16. A throw caddy device comprising:

a main body, wherein the main body has a first side surface, a second side surface, a front surface, a back surface, a top surface, and a bottom surface that oppose each other;

a collapsible top portion attached to the top surface of the main body;

a removable tripod chair connected to the main body;

wheels rotatably coupled to one or more axels connected to the main body;

a plurality of handles attached to the main body and the removable tripod chair;

discus case pockets attached to the first and second side surfaces of the main body;

pockets for storing items attached to the second side surface of the main body;

adjustable legs located at the bottom surface of the main body; and a large, zippered pocket attached to the front surface of the main body containing removable containers for organizing items.

* * * * *